United States Patent Office.

ISAAC L. MILES, OF PHILADELPHIA, PENNSYLVANIA.

Letters Patent No. 69,926, dated October 15, 1867.

---

IMPROVED COMPOSITION FOR PRODUCING ELASTIC FORMS FOR PRINTING.

---

The Schedule referred to in these Letters Patent and making part of the same.

---

TO ALL WHOM IT MAY CONCERN:

Be it known that I, ISAAC L. MILES, of Philadelphia, Pennsylvania, have invented an Improvement in Elastic Forms for Printing with; and I do hereby declare the following to be a full, clear, and exact description of the same.

My improved elastic forms are designed for printing on glass, earthen or crockery-ware, and other like materials; and consists of certain ingredients compounded as described hereafter, the composition being such as to run freely into the minute interstices of the mould, and to be less liable to shrink and warp, and more lasting than compositions heretofore used for a similar purpose, the forms being at the same time secure from the attack of insects.

In order to enable others to make my invention, I will now proceed to describe the manner of carrying it into effect.

I take two pennyweights of pure India rubber, and dissolve it in any of the usual solvents of that substance. I then add to the solution about one-eighth of an ounce of coal, lard, or olive oil, and about half an ounce of ninety-five per cent. alcohol, then agitate the whole until thoroughly mixed, and add about half an ounce of glycerine, and a pint or thereabouts of molasses. I then soak about one pound of fine glue or gelatine for about twelve hours in water, boil it fifteen minutes until thoroughly dissolved, and add to it about two grains of arsenic or other poisonous material. I then agitate the mixtures thoroughly together while in a heated state, and thus produce a composition ready for the mould, by which it is converted into forms for printing on glass, crockery-ware, and other like material.

The forms thus made are tough and elastic; the glycerine maintaining it in a comparatively moist state, and preventing it from warping and cracking, while the arsenic preserves it from the attack of insects and vermin.

I do not claim broadly a composition consisting of the within-named ingredients, when not combined with a poisonous material, as such a composition has heretofore been patented by L. Francis and C. H. Loutrel, but I claim as my invention, and desire to secure by Letters Patent as an improvement on the said composition of Francis and Loutrel—

A composition for elastic printing forms, consisting of the within-described ingredients in combination with arsenic or its equivalent.

In testimony whereof I have signed my name to this specification in the presence of two subscribing witnesses.

ISAAC L. MILES.

Witnesses:
CHARLES E. FOSTER,
JOHN WHITE.